(12) United States Patent
Merry, Jr. et al.

(10) Patent No.: US 7,685,338 B2
(45) Date of Patent: *Mar. 23, 2010

(54) SOLID STATE STORAGE SUBSYSTEM FOR EMBEDDED APPLICATIONS

(75) Inventors: David E. Merry, Jr., Irvine, CA (US); Mark S. Diggs, Laguna Hills, CA (US)

(73) Assignee: Siliconsystems, Inc., Aliso Viejo, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 11/753,502

(22) Filed: May 24, 2007

(65) Prior Publication Data

US 2008/0294835 A1    Nov. 27, 2008

(51) Int. Cl.
G06F 13/10    (2006.01)
G06F 12/00    (2006.01)

(52) U.S. Cl. .................... 710/62; 711/103; 361/679.31; 361/747

(58) Field of Classification Search ........................ None
See application file for complete search history.

(56) References Cited

U.S. PATENT DOCUMENTS

| | | | |
|---|---|---|---|
| 6,761,580 B2 * | 7/2004 | Chang | 439/502 |
| 6,886,057 B2 | 4/2005 | Brewer et al. | |
| 6,890,188 B1 | 5/2005 | Le | |
| 7,219,846 B2 | 5/2007 | Kuo et al. | |
| 7,262,961 B2 * | 8/2007 | Motoe et al. | 361/679.41 |
| 7,424,126 B2 * | 9/2008 | Sicari et al. | 381/384 |
| 2004/0087213 A1 | 5/2004 | Kao | |
| 2005/0176303 A1 | 8/2005 | Wu | |
| 2005/0197017 A1 * | 9/2005 | Chou et al. | 439/660 |
| 2005/0268007 A1 * | 12/2005 | Nakabayashi | 710/62 |
| 2006/0174049 A1 | 8/2006 | Lin et al. | |
| 2007/0053170 A1 * | 3/2007 | Yu | 361/737 |
| 2007/0260811 A1 | 11/2007 | Merry, Jr. et al. | |

* cited by examiner

*Primary Examiner*—Ilwoo Park
(74) *Attorney, Agent, or Firm*—Knobbe, Martens, Olson & Bear, LLP

(57) ABSTRACT

A non-volatile storage subsystem solution is provided for embedded applications. The storage subsystem is preferably designed to communicate with the host system using a signal interface, such as a USB or SATA interface, that uses substantially fewer signal lines than the IDE interface traditionally used for embedded applications. Thus, the amount of board real estate used to carry interface signals in the host system is reduced. To further reduce board real estate, the host system may include a processor that includes an integrated controller (e.g., a USB or SATA controller) corresponding to the host-subsystem signal interface. The storage subsystem may plug into, and lock to, an internal connector on a circuit board of the host system.

39 Claims, 7 Drawing Sheets

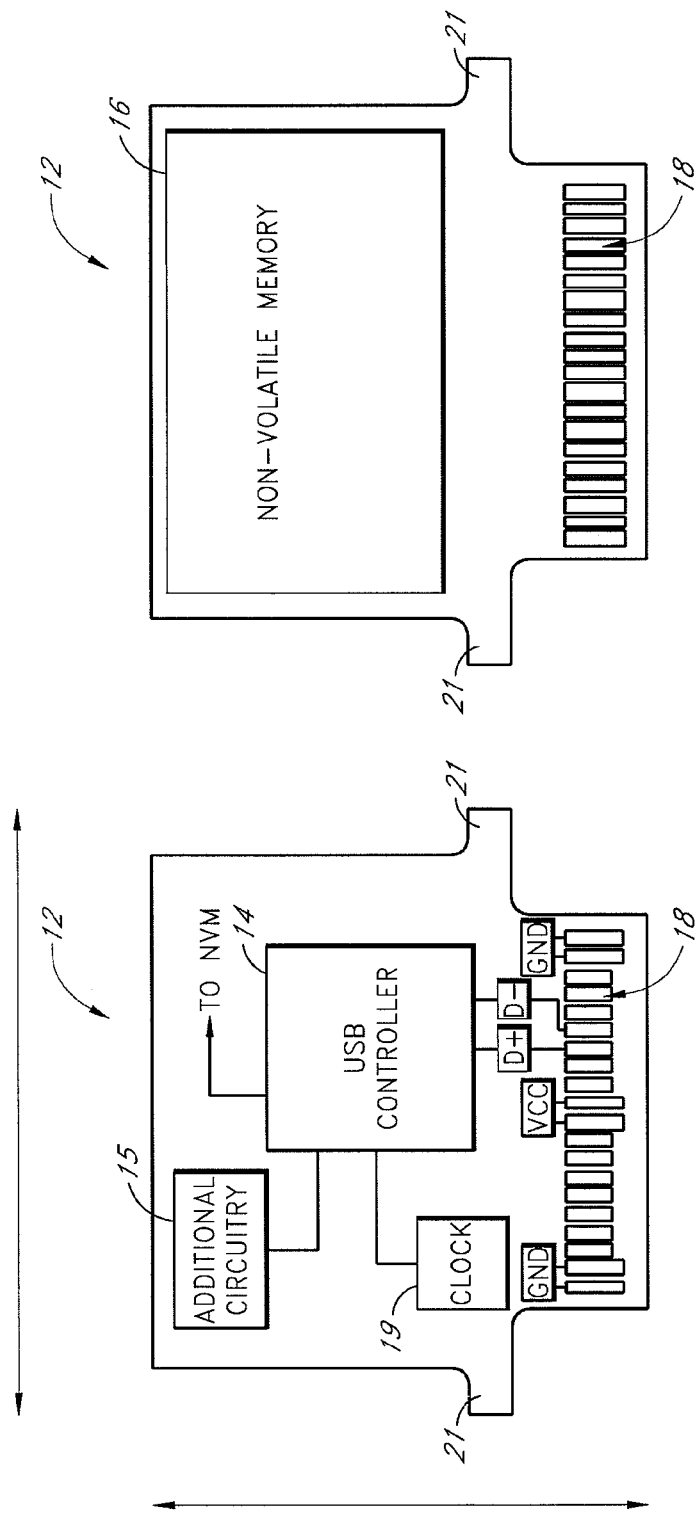
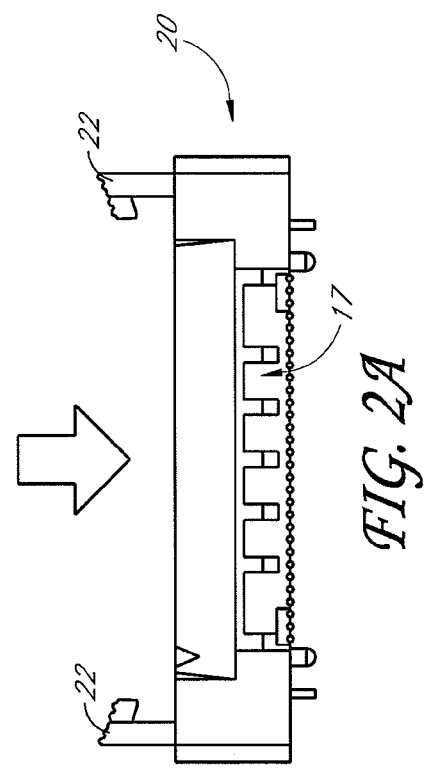
FIG. 2B
FIG. 2A

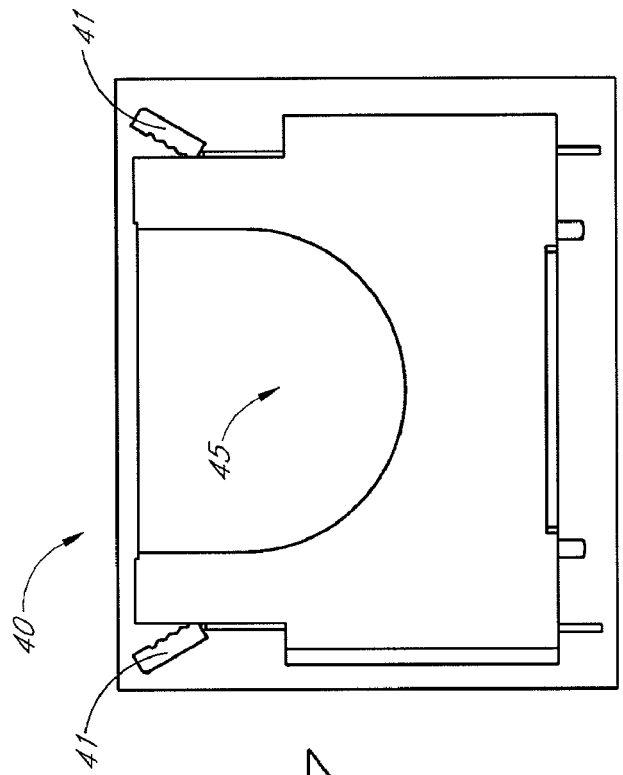
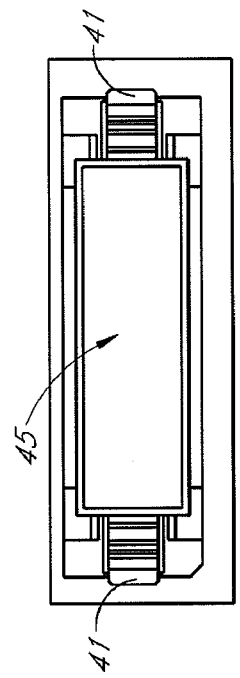
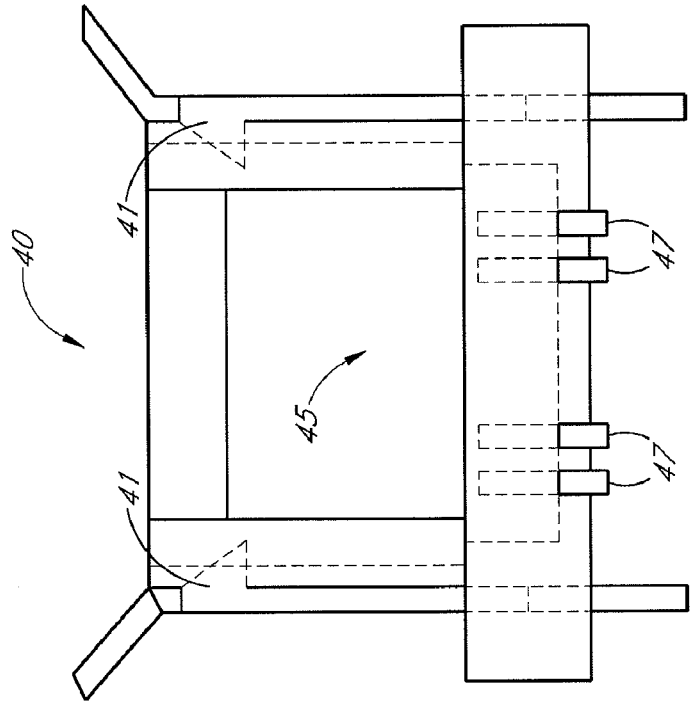
FIG. 5B
FIG. 5C
FIG. 5A

SOLID STATE STORAGE SUBSYSTEM FOR EMBEDDED APPLICATIONS

BACKGROUND OF THE INVENTION

1. Technical Field

The present invention relates to solid-state storage subsystems. More specifically, the present invention relates solid-state storage subsystems for embedded applications.

2. Description of the Related Art

Solid-state storage solutions are used to store a wide variety of data. With increasing memory capacity, a mixture of information (e.g., program files, setup files, user data, etc.) can be conveniently stored on a single solid-state storage subsystem such as a removable flash memory card. For some types of storage applications, the storage subsystem is commonly embedded within the host system. For example, an embedded storage subsystem may be used to store boot sequence and operating system code used by the host system.

Storage subsystems used in embedded applications commonly must be capable of tolerating substantial vibration and physical shock without detachment or data loss. The IDE (Integrated Drive Electronics) signal interface and connectors are typically used in embedded applications. The hardware used to implement the IDE interface, however, consumes a significant amount of board real estate within the host system. This is largely due to the large number of IDE signal lines (typically forty-four), and to the frequent need to include a separate IDE controller device on the host system's motherboard.

SUMMARY OF THE DISCLOSURE

Thus, there is a need for a solution that provides for environmentally reliable connections between the host system and a storage subsystem, while making efficient use of board real estate and resources.

A non-volatile storage subsystem solution is provided for embedded applications. The storage subsystem is preferably designed to communicate with the host system using a signal interface, such as a USB or SATA (Serial ATA) interface, that uses substantially fewer signal lines than the IDE interface traditionally used for embedded applications. Thus, the amount of board real estate used to carry interface signals in the host system, and the complexity of the board layout in the host system, are significantly reduced. To further reduce board real estate, the host system may, in some embodiments, include a processor that includes an integrated controller (e.g., a USB or SATA controller) corresponding to the host-subsystem signal interface. The use of such a processor eliminates the need for a separate controller device in the host system. The storage subsystem may plug into an internal connector on a circuit board of the host system. The storage subsystem and connector are preferably configured such that the storage subsystem can be selectively locked to the host circuit board, such that a reliable connection is maintained.

The present invention thus comprises various embodiments of a storage subsystem, and also comprises various embodiments of a host system configured to make use of such storage subsystems.

Neither this summary nor the following detailed description purports to define the invention. The invention is defined by the claims.

BRIEF DESCRIPTION OF THE DRAWINGS

Systems and methods which embody the various features of the invention will now be described with reference to the following drawings, in which:

FIGS. 2A-B illustrate a USB storage subsystem configured to securely latch with a physical connector and configured to be embedded in a host system according to one embodiment of the invention.

FIGS. 5A-C illustrate a physical connector compatible with an embedded USB storage subsystem according to another embodiment of the invention.

DETAILED DESCRIPTION OF THE PREFERRED EMBODIMENTS

Specific embodiments of the invention will now be described with reference to the drawings. This description is intended to illustrate example implementations of, and applications for, the present invention, and is not intended to be limiting. Nothing in this description is intended to imply that any particular feature, characteristic, or mode of operation is a requirement of the invention. The invention is defined by the claims.

According to specific embodiments of the invention, a storage solution is provided that enables a storage subsystem to easily and cost effectively be embedded in a host system. The host system may be any of a variety of types of computing systems, such as a handheld computer, router, notebook computer, or servers used in industrial, medical or military applications. The host system may be used in an environment, such as plant or control system, in which the host system is commonly subjected to vibration or physical shock. The use of USB storage solutions in these environments has traditionally been disfavored because of their relative instability. Commonly available USB connectors are designed for peripheral uses that do not require the same reliable operation. Bit errors that may be common and acceptable in these situations typically are not acceptable with embedded storage.

One embodiment of the invention is a storage subsystem that uses a USB signal interface, but a non-USB connector, to interface with the host system. Because the USB interface uses fewer signal lines than IDE (typically four, as opposed to forty-four), the amount of circuit board real estate occupied in the host is significantly reduced, and the design of the host system is simplified. To further reduce board real estate, the host system preferably includes an embedded processor having an integrated USB controller. Thus, a separate USB controller device is not required. To provide a reliable connection, the storage subsystem may attach to a circuit board of the host system using a slot or other connector that includes a latch or other locking mechanism. Additionally, the embedded USB module may be dimensioned to ease system design. For example, the embedded USB module may have a thickness (or height) that is designed to allow for use in common stacked board designs.

As discussed below, a signal interface other than USB may alternatively be used. For example, in one embodiment, a SATA interface is used instead of a USB interface.

Overview

Figure 1:
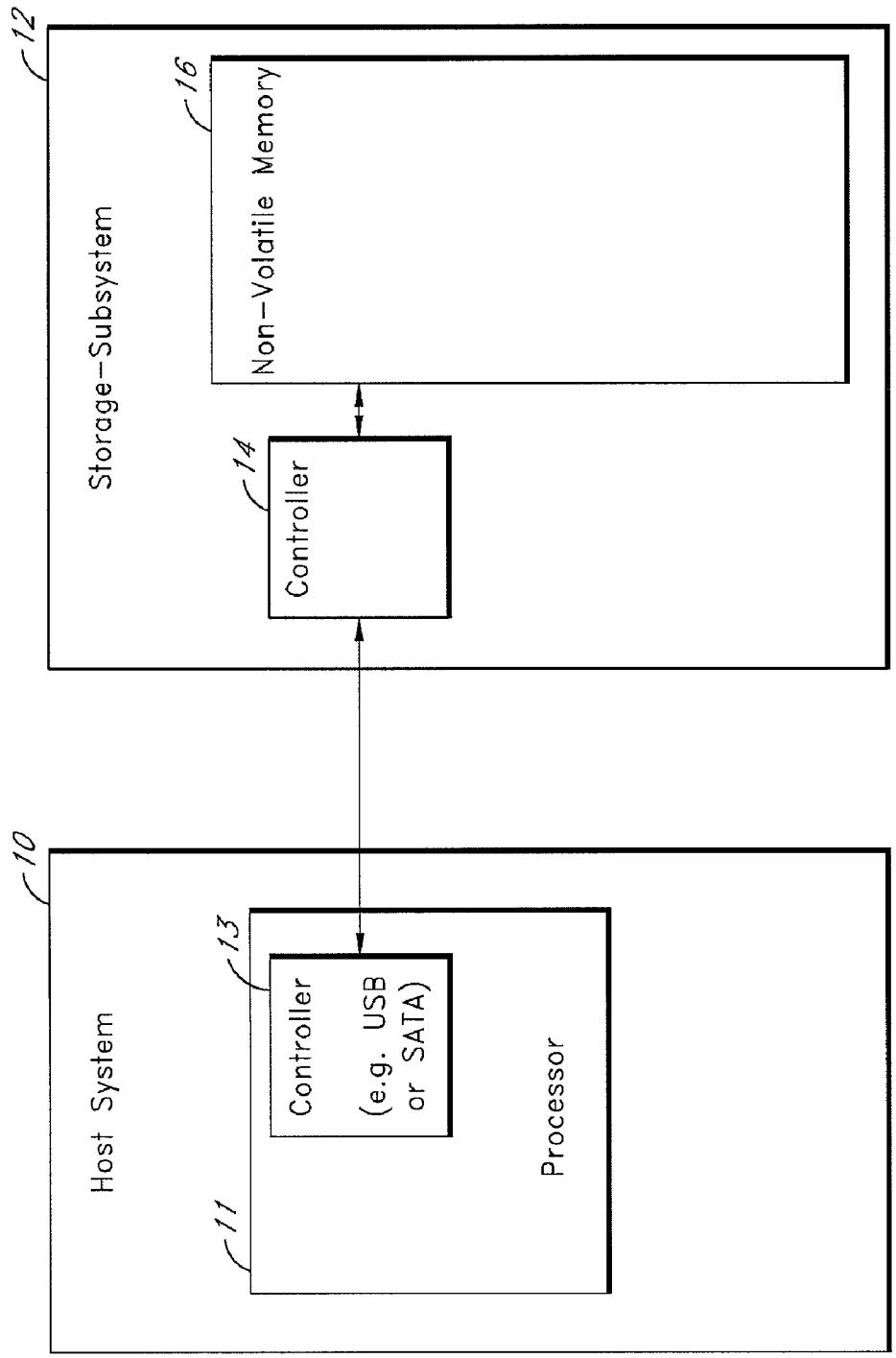
FIG. 1 is a block diagram illustrating a host system having an embedded processor and integrated controller linked to an embedded solid-state storage subsystem according to one embodiment of the invention.

FIG. 1 is a block diagram illustrating a host system 10 connected to a solid-state storage subsystem 12 according to one embodiment of the invention. The host system 10 is a computing system such as a handheld computer, workstation, router, blade server, or any other type of computing system. The storage subsystem 12 may, in some implementations, be the sole non-volatile storage system (or sole mass storage system) of the host system 10.

Although shown separately from the host system 10, the storage subsystem 12 is designed to be embedded within the host system 10, meaning that no external slot or port is provided for attaching the storage subsystem 12 to the host system. Thus, to add or remove the storage subsystem 12 to/from the host system 10, the housing of the host system typically must be opened or removed. As described below, the storage subsystem in this and the other illustrated embodiments preferably plugs into a connector (not shown) mounted on a circuit board, such as the motherboard, of the host system 10. Examples of specific connectors that may be used are shown in subsequent drawings and are discussed below.

The host system 10 may, but need not, be designed to boot from, and/or execute application software stored on, the storage subsystem 12. The host system 10 may additionally or alternatively use the storage subsystem 12 to log data generated or captured by the host system. In some embodiments, the host system 10 may provide operating system functionality and a boot process for the subsystem 12. The host system 10 executes a driver program that provides functionality for communicating with the subsystem 12, such as by issuing commands in accordance with a USB or other standard.

In the illustrated embodiment, the host system 10 has a processor 11 that includes an integrated controller 13, such as a USB or SATA controller. Examples of suitable commercially-available processors that include an embedded USB controller include the XScale® IXP4xx Network Processors available from Intel® and the PowerPC® 440EP processor available from AMCC. Examples of suitable commercially-available processors that include an embedded SATA controller include the XScale® IOP348 I/O Processor available from Intel® and the PowerPC® 460EX processor available from AMCC. In other embodiments, processor 11 of the host system 10 does not include an integrated controller 13. In these embodiments, a controller may be implemented as, for example, a chipset or FPGA located external to the processor 11. Typically, the processor 11 is the main processor or CPU of the host system 10, and executes code stored on the storage subsystem 12. The processor 11 is typically mounted to the same circuit board as the connector.

The solid-state storage subsystem 12 comprises a controller 14 and a non-volatile solid-state memory (NVM) array 16. The NVM array may, but need not, be implemented using NAND memory components. As is conventional, the controller 14 is configured (typically via firmware) to write data to, and read data from, the NVM array 16 in response to commands from the host 10. The controller also preferably implements a wear-leveling algorithm, as is known in the art, to distribute write operations across memory blocks of the NVM array. As will be recognized, the NVM array in this and the other disclosed embodiments may be replaced or supplemented with a magnetic disk drive.

In one embodiment, the controller 14 executes a firmware program to perform processes as described herein and comprises a USB flash disk controller. The controller 14 may alternatively be implemented using another type of device, such as an application-specific integrated circuit (ASIC), a processor or other substrate configuration, program logic and/or software which operate as described herein or similar thereto, or may comprise multiple distinct devices. As is conventional, the controller 14 is configured to write data to, and read data from, the NVM array 16 via NVM or memory control signals in response to commands from the host system 10.

The NVM array 16 may comprise a plurality of solid-state storage devices coupled to the controller 14. The solid-state storage devices may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid-state storage devices may be physically divided into blocks, pages and sectors, as is known in the art.

The following subsections provide additional details regarding specific embodiments of the system shown in FIG. 1. Although some of these embodiments are described as using a USB controller and signal interface, it should be understood that a different type of controller and signal interface, such as but not limited to SATA, may alternatively be used.

USB Storage Subsystem

FIGS. 2A and 2B show the physical configuration of a USB-based embodiment of the storage subsystem 12. FIG. 2A is a frontal view and shows a corresponding connector 20, and FIG. 2B is a rear view. The location of certain devices on the circuit board, whether on the front or back, may of course be modified according to specific design constraints. The arrangement shown is for purposes of explanation only. This embodiment advantageously allows for the reliable use of the subsystem 12 in a variety of systems and environments while simplifying the design process of the host system. The storage subsystem 12 contains a USB controller mounted to the front side of a circuit board. As described with reference to FIG. 1, the USB controller 14 is configured to write data to, and read data from, the NVM array 116 and may be implemented according to a variety of methods in different embodiments.

With reference to FIG. 2B (rear view), the USB controller 14 communicates with non-volatile memory 16 mounted on the back side of the board. The storage subsystem 12 further comprises electrical contacts ("pins," "pads," or "positions") 18 connected to the controller 14 as shown in FIG. 2A. While a number of pins 18 are shown, the USB interface requires only four active pins. Therefore, in some embodiments, only four of the twenty positions shown (on the front of storage subsystem 10) will be active. In these embodiments, any of these pins may represent a D+ signal line, a D− signal line, a ground line, or the power supply (VCC) line. In some embodiments, multiple pins 18 are used to redundantly provide a connection between USB storage subsystem 12 and a host system.

In the embodiment shown, eight positions are active. However, because the storage subsystem 12 advantageously requires only four electrical contacts 18 be active, a system designer may design the board wiring layout of the host system with four lines connecting the physical connector 20 and the USB controller (preferably integrated within the embedded processor) or other device circuitry. In contrast, the IDE interface uses forty-four signal lines that typically must be routed from a connector to the appropriate host system circuitry. In any system design, these extra lines add space and complexity. Thus, the illustrated design simplifies the process of board design and reduces the overall board real estate required for an embedded storage subsystem solution. This may result in the ability to produce smaller products with less design time, reducing total costs. The design also makes the use of an embedded storage subsystem practical and feasible in applications having significant space limitations.

The USB storage subsystem 12 engages a physical connector 20 which may be mounted on a circuit board or substrate, such as but not limited to a motherboard, of the host system 10. When the USB storage subsystem 12 is inserted into the physical connector 20, the pins 18 of the subsystem 12 are in contact with electrical contacts/sockets 17 of the connector 20. In a preferred embodiment, the contacts 17 of the connector 20 are wired to and in electrical contact with a USB controller 13 (FIG. 1) integrated in the embedded processor 11 of the host system or with other circuitry as specified by the host system design. The processor 11 and connector 20 may be mounted to a common circuit board (e.g., the motherboard) of the host system 10.

The physical connector 20 comprises latches or "board locks" 22 in the embodiment shown. The latches 22 work in cooperation with protrusions or wings 21 of the subsystem 12. When the storage subsystem 12 is inserted in the connector 20, the latches 22 preferably interact with wings 21 to securely attach and electrically connect the USB storage subsystem 12 to the connector 20 and host circuit board. This connection is preferably semi-permanent, meaning that it is likely to be maintained during normal operation of a host system for an extended period of time. The storage subsystem 12 can nevertheless easily be removed without damaging either the host system 10 or storage subsystem 12. The physical connection is sufficient to maintain proper electrical communication between the host system 10 and the storage subsystem 12 when the host system is subjected to vibration and physical shock.

In a preferred embodiment, the latches 22 and wings 21 are configured such that the USB storage subsystem 12 is pluggably inserted into the connector 20 with relative ease, while the accidental disconnection of USB storage subsystem 12 from connector 20 is greatly impeded. For example, when storage subsystem 12 is inserted in the physical connector 20 according to the embodiment shown, the angled design of the surface of latches 22 allows wings 21 to force the latches 22 outward. When subsystem 12 is inserted completely, wings 21 are below the ledges of the latches 22, allowing latches 22 to return to their original position. A subsequent force pulling the subsystem 12 up and away from the physical connector 20 would generally be ineffective in disconnecting the subsystem 12 as long as the latches 22 remain positioned over the wings 21.

Of course, a variety of different connections may be used in some embodiments instead of providing a latching mechanism and wings. For example, the storage subsystem 12 may attach to the connector 20 using screws. In these embodiments, when the subsystem 12 has been inserted, the screws may interact with the threads, substantially locking the USB storage subsystem 12 to the connector 20. In some embodiments, the connection between pins 18 and sockets 17 is such that the frictional force between USB storage subsystem 12 and physical connector 20 substantially prevents the accidental disconnection of the storage subsystem 12.

In some embodiments, the physical dimensions of the USB storage subsystem 12 are optimized to meet standard board constraints. For example, in the design shown in FIGS. 2A and 2B, the storage subsystem 12 preferably has a height of less than approximately 30 millimeters, and more preferably, of approximately 22 mm. Having a height of less than 30 mm may, in typical systems, allow for the use of the USB storage subsystem 12 in stacked board designs. In those designs, the vertical distance between two boards is typically greater than 30 millimeters. Of course, in some embodiments, the design of the individual host system will dictate this and other design constraints. For example, the height may need to be less than 20 millimeters in some embodiments. In other embodiments, a larger design may be acceptable. In some embodiments, the height may be between 10-20 millimeters, 20-25 millimeters, or 25-30 millimeters.

The width of the USB storage subsystem 12 is preferably less than about 30 millimeters, and more preferably, is about 26.25 millimeters as defined by the edges of the wings. In some embodiments, the width of the USB storage subsystem 12 is approximately 22.25 millimeters without the wings. In some embodiments, the width of the storage subsystem may be approximately 10-20 millimeters, 20-25 millimeters, or 25-30 millimeters. As is the case with the height of the storage subsystem, in some embodiments, design constraints will dictate a width outside of these ranges. For example, a width greater than 30 millimeters may be acceptable in some embodiments.

In some embodiments, the thickness of storage subsystem 12 is preferably less than about 5 millimeters. In other embodiments, the thickness of the storage subsystem 12 may be greater than 5 millimeters. In some embodiments, the USB storage subsystem 12 may be mounted horizontally such that the vertical height is minimized between the board on which the physical connector 20 is mounted and, for example, a second board located above the first board, a host system casing, or another host system component.

The USB storage subsystem 12 further comprises additional circuitry 15 and a clock device 19. The additional circuitry 15 may provide additional functionality that allows for greater control, security, and reliability of the embedded USB storage subsystem 12. For example, the additional circuitry 15 may provide for the protecting of data stored in the NVM array 16 from corruption when interruptions or other irregularities occur in a power signal line supplied by the host system 10, such as described in U.S. Pat. No. 6,856,556, entitled "Storage Subsystem with Embedded Circuit for Protecting against Anomalies in Power Signal from Host." In some embodiments, the additional circuitry 15 may provide for the reliable destruction of data such that it cannot be recovered, as described in U.S. Patent Publication No. 2006/0117393, entitled "Systems and Methods for Reducing Unauthorized Data Recovery from Solid-State Storage Devices." In other embodiments, the additional circuitry 15 and/or the controller 14 may some include a combination of these and other functions.

Figure 3C:
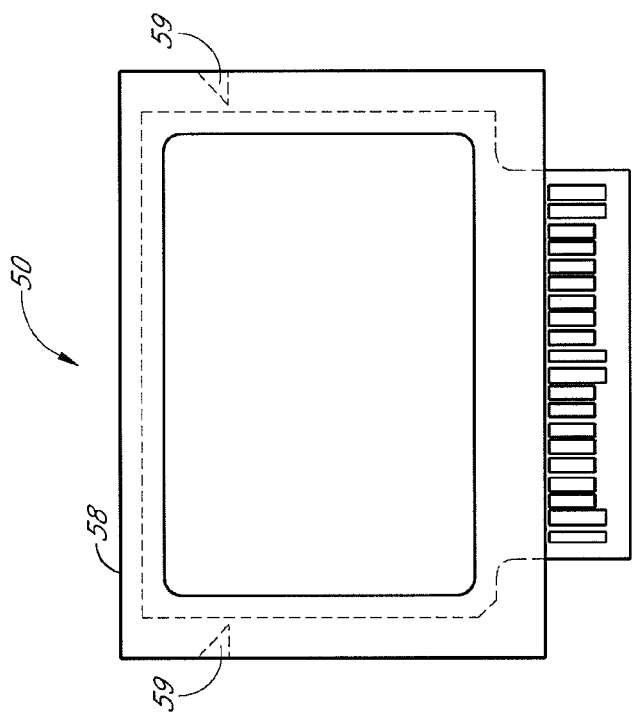
FIGS. 3A-C illustrate a USB storage subsystem according to FIG. 1 further comprising a housing according to one embodiment of the invention.
Figure 3B:
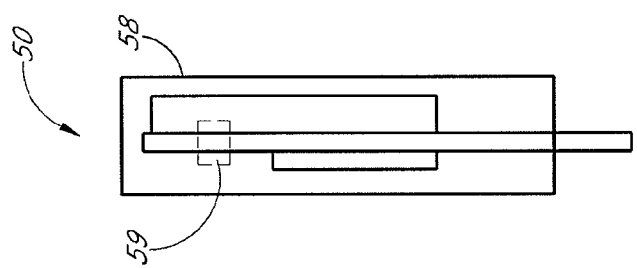
Figure 3A:
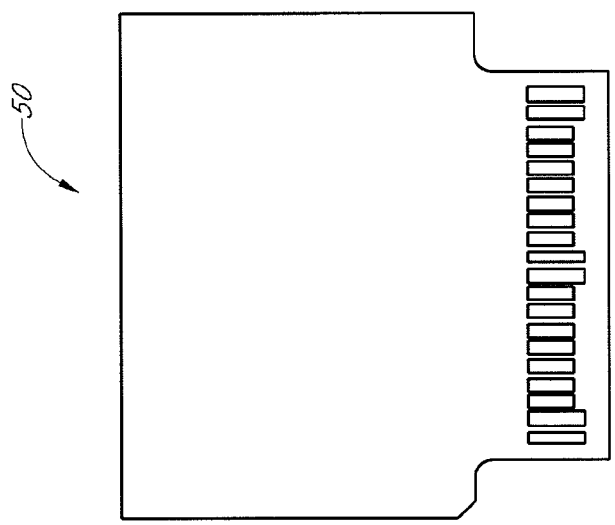

FIGS. 3A-C show another embodiment of an embedded USB storage subsystem 50. As shown in FIGS. 3B and 3C, the active electrical components of the USB storage subsystem 50 are enclosed in a case or housing 58. In some embodiments, the dimensions of the case 58 may be selected to meet standard or custom board design constraints. The storage system 50 preferably latches with a connector, such as the connectors shown in FIGS. 4A-C and 5A-C, utilizing a mechanical feature of the case 58. For example, in the embodiment shown, inserts 59 (FIGS. 3B and 3C) are located in the case 58. In some embodiments, when the USB storage subsystem 50 in the case 58 is inserted into a connector, compressive latches on the connector are originally forced outward by the insertion of the USB storage subsystem 50. When the storage system is inserted into the connector to the proper depth, the compressive latches of the connector are forced into the openings 59 of the case 58 creating a semi-permanent connection.

Additional Connectors

Figure 4B:
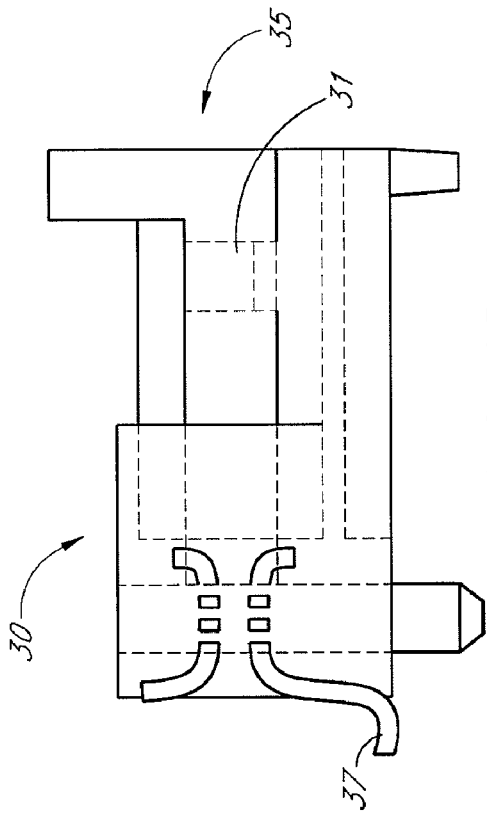
FIGS. 4A-C illustrate a physical connector compatible with an embedded USB storage subsystem according to one embodiment of the invention.
Figure 4C:
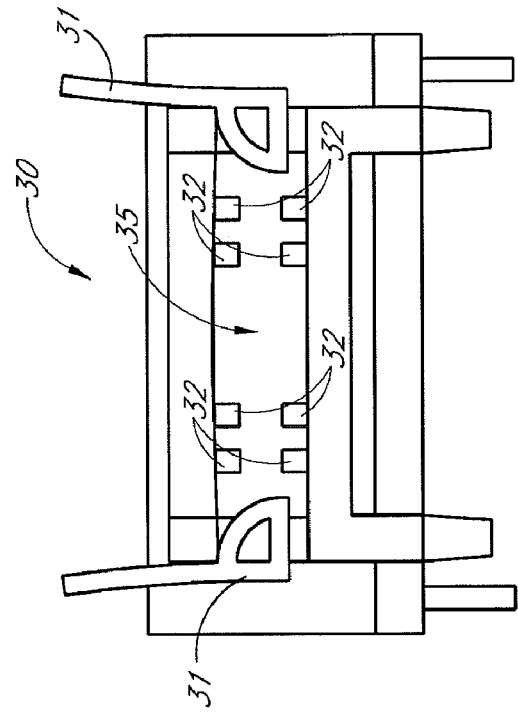
Figure 4A:
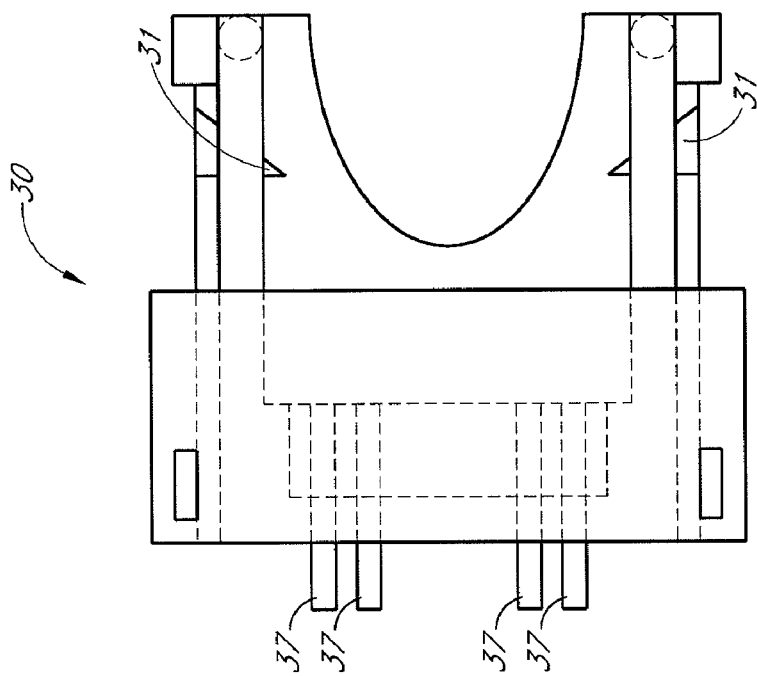

FIGS. 4A-C show several views of one embodiment of a connector 30 allowing for the horizontal mounting the USB storage subsystem. FIG. 4A shows an overhead view of the physical connector 30. The physical connector 30 includes latching mechanisms 31, electrical contacts 37, and a subsystem insertion cavity 35. When inserted in the connector 30, the pins of the storage subsystem are in electrical contact with the contacts 37, and the subsystem is physically restrained by latches 31 working in cooperation with a counterpart device of the storage subsystem. As shown, the angled design on the latches 31 allows for the relatively easy insertion of the storage subsystem in the cavity 35. However, when latched with the corresponding mechanism of the subsystem, removal of the storage subsystem is significantly impeded. Thus, some embodiments of the USB storage subsystem and the connector 30 are better able to maintain a state of reliable electrical connection in adverse environmental conditions such as vibration or the like, as compared to typical USB connectors. FIG. 4B shows a side view of the connector 30.

FIG. 4C shows a view of the insertion cavity 35 (i.e., a front view of the connector 30) according to one embodiment. As can be seen with reference to FIG. 4C, in the embodiment shown, latches 31 may be manipulated by levers extending above the upper surface of the body of connector 30 by applying an inward force (i.e., squeezing) to the top portions of the latches 31. A portion of the latches 31 interacting with the USB storage subsystem are moved away from the center of cavity 35 and allow for the relatively easy removal of the USB storage subsystem. Thus, the USB storage subsystem is selectively attached to the connector 30 in a semi-permanent fashion according to these embodiments. A user may easily remove the USB storage subsystem 10 from the connector 30 when desired. However, in embedded applications in which a USB storage subsystem contains information and data that will be used by the host system 10 over the life of the system, or where the storage subsystem is not meant to be removed, the semi-permanent connection may allow for the reliable use of the subsystem.

The vertical mount connector 40 shown in FIGS. 5A-5C has latches 41, electrical contacts 47, and an insertion cavity 45, as seen in FIG. 5B. Compression of the latches 41 allows for the easy removal of the storage system 50. Otherwise, the storage system 50 is secured by the latches 41 when installed in connector 40.

CompactFlash Card Form Factor

Figure 6:
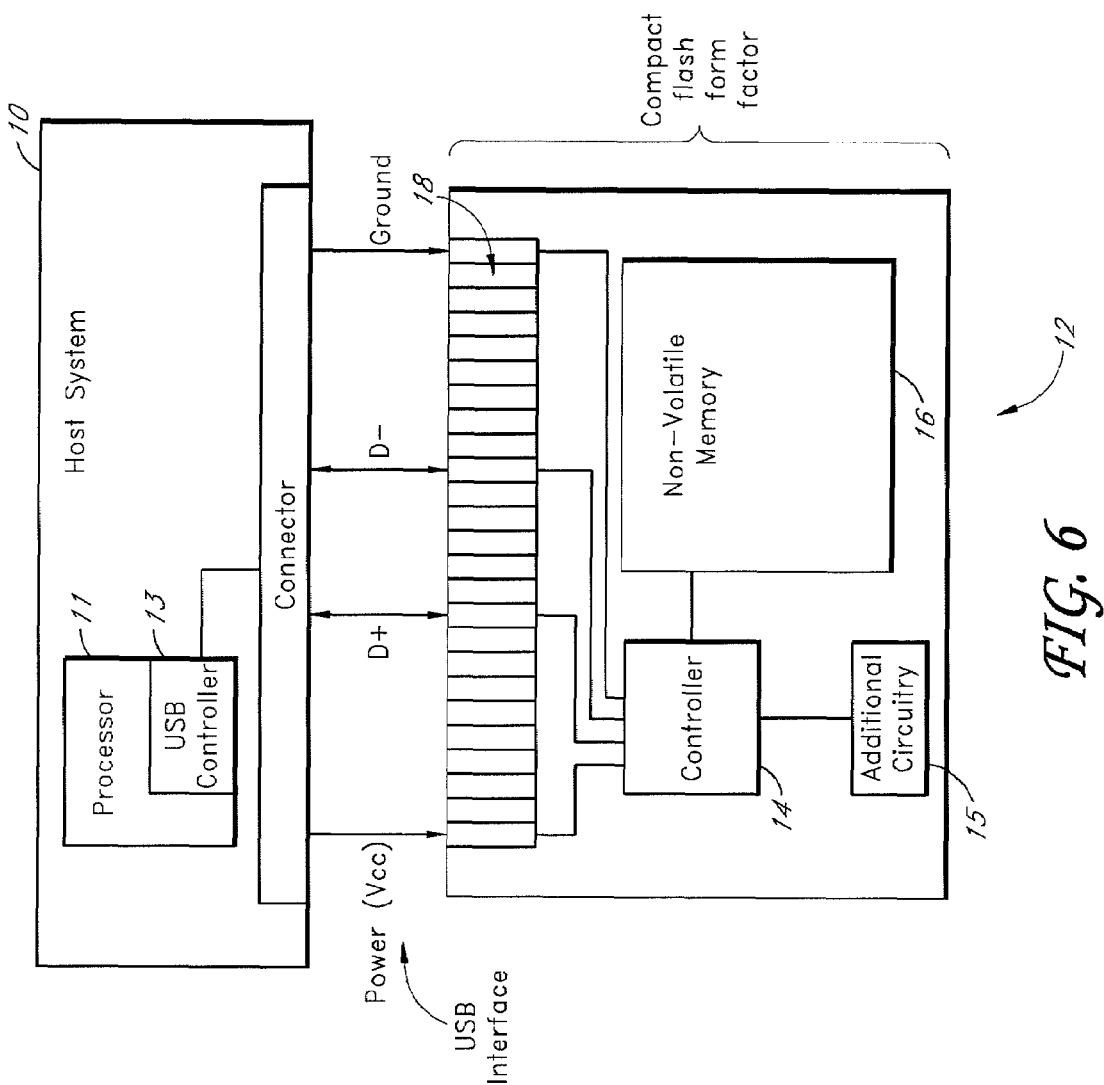
FIG. 6 illustrates a storage subsystem utilizing a USB interface and having a CompactFlash form-factor according to one embodiment of the invention.

FIG. 6 shows a USB storage subsystem 12 according to another embodiment of the invention. In this embodiment, the USB controller 14, non-volatile memory 16, and additional circuitry 15 are mounted to a card or substrate that partially or fully complies with a standard CompactFlash form factor. The subsystem's connector 18 is a standard CompactFlash connector, although only a small subset of the connector's electrical contacts are actually used (as discussed below). The storage subsystem 12 may, but need not, include a case or housing that houses the various active components. The storage subsystem 12 may, for example, plug into a CompactFlash connector mounted to the host system's motherboard such that the storage system is perpendicular to the motherboard.

Although CompactFlash cards are typically designed for peripheral use, they are sufficiently small for many embedded applications. CompactFlash cards are approximately 36 mm in height by 40 mm in width, and have an approximate thickness of either 3.3 mm or 5 mm. While this size is larger than some of the embodiments described above, a CompactFlash card having approximately these dimensions is significantly smaller than traditional embedded storage. For example, a 2.5 inch hard disk drive may be about ten times as large as a CompactFlash card. In addition, because of the popularity of the CompactFlash form-factor, CompactFlash connectors are readily available. Many CompactFlash connectors provide a sufficiently sturdy physical connection for embedded applications, and some include a latching mechanism that may be preferable in embedded environments.

Traditional CompactFlash cards use an IDE interface and are therefore configured with an IDE compatible connection (a miniaturized advanced technology attachment connector). Thus, the physical connector 18 of storage subsystem 12 may have forty or more available positions (typically fifty). However, in the embodiment shown, the storage subsystem 12 uses a USB signal interface and therefore requires as few as four available positions to be active. The four active positions shown comprise a ground line, a power line (VCC), a D+ signal line, and a corresponding D− signal line. As with the embodiments described above, this reduction in the number of signal lines reduces the overall board space required, and simplifies the design of the host system 10.

Many of the advantages discussed above can also be realized in a non-embedded environment. In some embodiments, a card having a CompactFlash form-factor and utilizing a USB interface may be used as a peripheral storage system rather than being embedded in the host system 10. In these embodiments, a CompactFlash connector is included in the host system 10, for example, along the housing of a portable computing system or the case of a laptop computer. However, the CompactFlash physical connector may be connected to a USB controller of the host system (for example, via a cable connected to a host system motherboard). Even when a standard ribbon cable is used having 40+ wires to bridge the subsystem to the host system circuit board, as few as four of those wires need to be active according to the USB interface. Thus, the design of the host system circuit board(s) may be simplified by utilizing only the wiring needed by the USB interface. Additionally, the design of the host system 10 may advantageously incorporate readily available components such as a CompactFlash form-factor connector and cables.

A custom form factor (FIG. 2) and a CompactFlash form factor (FIG. 6) have been described previously, but other form factors may be utilized according to certain embodiments. For example, a system having USB or SATA signal interface may be utilized in a Secure Digital, microSD, MultiMedia Card (MMC), or RSMMC form factor. Other embodiments may utilize other form factors.

Serial ATA Signal Interface

In each of the embodiments described above, the USB signal interface may be replaced with a serial ATA (SATA) interface. For example, as shown FIG. 7, a SATA interface may be used in the CompactFlash embodiment of FIG. 6. In this embodiment, the storage subsystem 22 comprises a serial ATA controller 24 connected to the non-volatile memory 16. The serial ATA controller 24 is capable of receiving data and control signals from host system 10 via electrical connectors 18, as well as reading data from and writing data to NVM array 16 in response to those signals. The storage subsystem 22 further comprises additional circuitry 15 which may allow for additional functionality as described previously.

Figure 7:
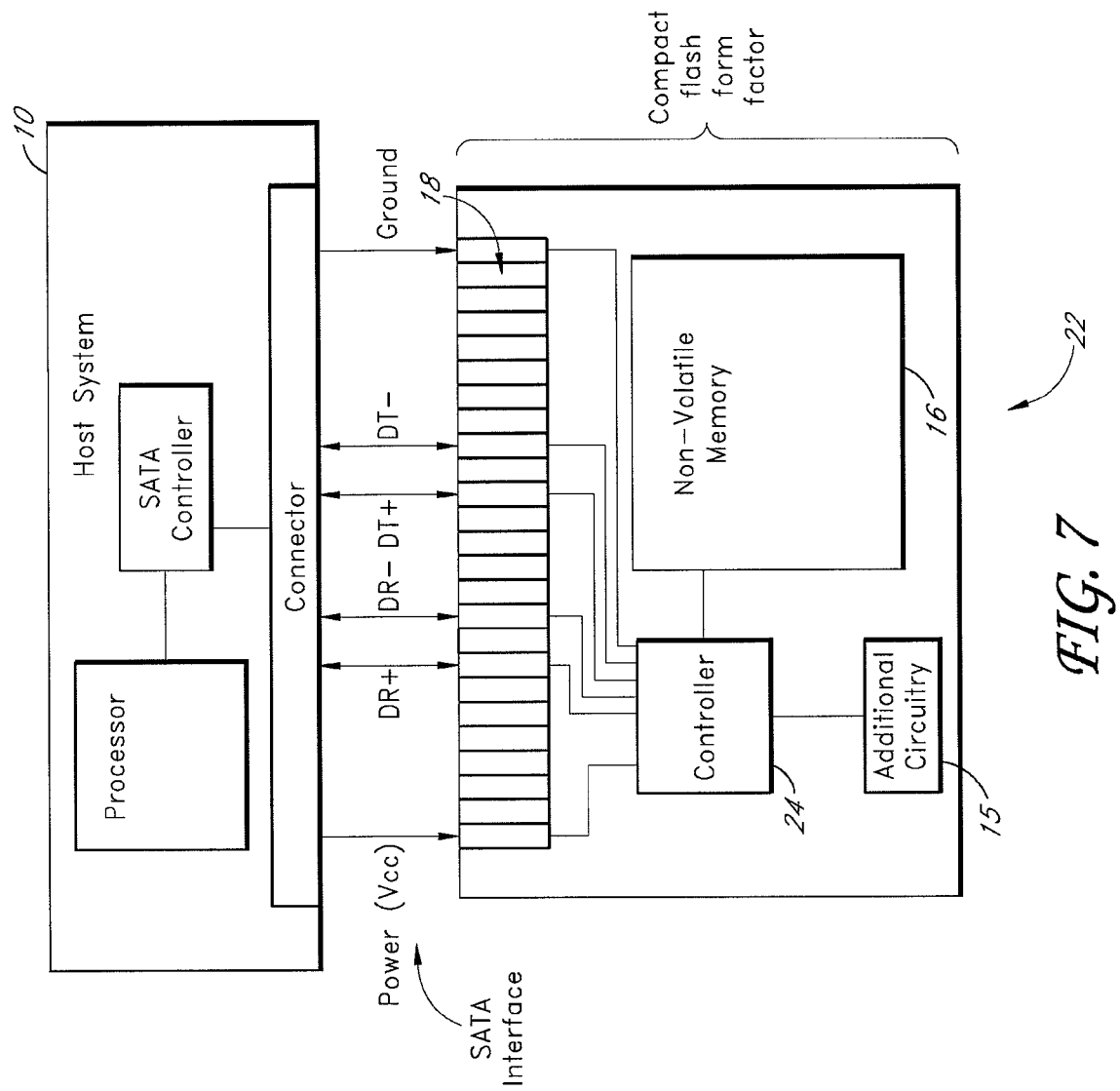
FIG. 7 illustrates a storage subsystem utilizing a serial ATA interface and having a CompactFlash form-factor according to one embodiment of the invention.

As illustrated in FIG. 7, the storage subsystem 22 plugs into a CompactFlash connector of the host system 110 such that the storage subsystem is embedded within the host system. This connector may, for example, be mounted to the host system's motherboard such that the storage subsystem is perpendicular to the motherboard. In this particular embodiment of FIG. 7, the host system's processor 11 and SATA controller 13 are separate devices; in other embodiments, the SATA controller 13 may be integrated into the processor 11.

The SATA signal interface provides many of the same benefits as the USB signal interface. For example, in an embedded system, a serial ATA interface uses fewer signal lines than a traditional IDE interface. This may allow for reduced complexity of board design and further reduction in size of the whole system. As compared to an IDE interface, which may use forty-plus signal lines, the serial ATA standard uses seven signal lines, of which four are active data lines. For example, one position is used for a power line (VCC), two positions are used for ground lines, and the remaining positions are used for DR+, DR−, DT+, and DT− data signal lines. When used over a CompactFlash physical connector, which has fifty positions, only a handful of these positions need to be actively wired on the host system circuit board. For example, in the embodiment shown, only seven positions are used.

As with the USB storage subsystem 12 having a CompactFlash form-factor as described above, the serial ATA interface storage subsystem with a CompactFlash form-factor is preferably used in an embedded application or embedded in a host system. However, the CompactFlash form-factor, being convenient for transportation by a user may additionally be used as a peripheral storage system. In such embodiments, the host system 10 is designed to have a CompactFlash form-factor connector along its housing or casing. This connector may be wired to a circuit board of the host system and in electrical connection with a serial ATA controller or other appropriate circuitry. Thus, even utilizing the CompactFlash connector and wiring from the port located along the housing of the host system, the mother board of the host system may still advantageously be designed utilizing a simplified wiring pattern for transmitting serial ATA interface signals.

Embodiments have been described utilizing USB and SATA signal interfaces. However, in other embodiments, other signal interfaces may be used with systems having various form factors as described previously. For example, a storage subsystem may utilize SD, microSD, MMC, or RSMMC signal interfaces. Many of the advantages discussed with respect to the USB and SATA signal interfaces may be recognized with these and other signal interfaces.

CONCLUSION

In each of the embodiments described herein, the storage subsystem may implement one or more additional features for protecting against data losses. As one example, the storage subsystem's controller may be programmed or configured to maintain usage statistics reflective of the wear state, and thus the expected remaining life, of the non-volatile memory array, as described in U.S. patent application Ser. No. 11/429,936, filed May 8, 2006, the disclosure of which is hereby incorporated by reference. Where such functionality is provided, the storage subsystem may implement a vendor-specific command or API that enables the host system 10 to read out information regarding the wear state/expected life of the storage.

The foregoing embodiments have been presented by way of example only, and are not intended to limit the scope of the inventions. The invention is defined only by the claims. Further, all possible combinations of the disclosed features are contemplated, and are intended to fall within the scope of this disclosure.

What is claimed is:

1. A storage subsystem adapted for embedded use within a host system, the storage subsystem comprising:
   an array of non-volatile solid-state memory, the non-volatile solid-state memory containing a set of instructions corresponding to a boot sequence for the host system;
   a controller capable of writing data to, and reading data from, the non-volatile solid-state memory in response to commands received by the storage subsystem from the host system;
   a connector for electrically and pluggably connecting the storage subsystem directly to a circuit board of the host system, said connector having a plurality of positions with a respective position for each of the signal lines of an IDE interface, with a subset of the plurality of the positions being used as active positions with electrical contacts corresponding to SATA (Serial Advanced Technology Attachment) signal lines and no positions being used as active positions for IDE signal lines, and having a non-SATA physical configuration; and
   a locking structure configured to secure the storage subsystem for embedded use within the host system by locking the storage subsystem to the circuit board of the host system,
   wherein the connector is connected to the circuit board such that the connector and the storage subsystem are not physically accessible from outside a housing of the host system without removing the housing, and
   wherein the controller is configured to communicate with the host system via said connector using a SATA signal interface.

2. The storage subsystem of claim 1, wherein the connector has a total of four electrical contacts that are capable of being used to carry data between the controller and the host system.

3. The storage subsystem of claim 1, wherein the locking structure comprises first and second wings that extend outward from sides of the storage subsystem.

4. The storage subsystem of claim 1, wherein the locking structure comprises a portion of a latching structure that enables the storage subsystem to be latched to and unlatched from the circuit board of the host system.

5. The storage subsystem of claim 1, wherein the storage subsystem has a height of less than 30 millimeters.

6. The storage subsystem of claim 5, wherein the storage subsystem has a width of less than 30 millimeters.

7. The storage subsystem of claim 1, wherein the storage subsystem lacks an external housing, such that active components of the storage subsystem are exposed.

8. The storage subsystem of claim 1, further comprising a housing configured to contain the controller and the non-volatile solid-state memory, wherein said housing has a width and a height, and wherein said width and said height are each less than about 30 mm.

9. The storage subsystem of claim 1, wherein the storage subsystem has a height of between about 25 mm and 30 mm.

10. The storage subsystem of claim 1, wherein the storage subsystem has a height of between about 20 mm and 25 mm.

11. The storage subsystem of claim 1, wherein the storage subsystem has a height of between about 10 mm and 20 mm.

12. The storage subsystem of claim 1, wherein the storage subsystem has a width of between about 20 mm and 30 mm.

13. The storage subsystem of claim 1, wherein the storage subsystem has a width of less than about 20 mm.

14. The storage subsystem of claim 1, wherein the locking structure comprises a pair of wings located on opposite sides of the storage subsystem proximate to the connector.

15. The storage subsystem of claim 1, wherein the locking structure comprises at least one receiving portion of a compressive latch mechanism.

16. The storage subsystem of claim 1, wherein the locking structure comprises at least a portion of the connector, said portion of the connector configured to firmly engage at least a portion of a socket connector located on the host system.

17. The storage subsystem of claim 1, wherein the connector comprises a portion of a circuit board of the storage subsystem and the electrical contacts are located on the portion of the circuit board.

18. The storage subsystem of claim 1, wherein said set of instructions are configured to be executed by the host system.

19. The storage subsystem of claim 1, wherein the locking structure comprises one or more screws that secure the storage subsystem to the host system.

20. The storage subsystem of claim 1, wherein the connector provides friction that prevents the storage subsystem from being disconnected from the host system.

21. A host system comprising:
- a circuit board having a processor device mounted thereon, said processor device including an integrated Serial ATA (SATA) controller; and
- a non-SATA connector mounted to the circuit board and configured to directly connect a non-volatile solid-state storage subsystem as an embedded device, said non-SATA connector having a plurality of positions with a respective position for each of the signal lines of an IDE interface, with a subset of the plurality of the positions being used as active positions with a plurality of electrical contacts corresponding to a set of SATA signal lines to enable the processor device to communicate with the non-volatile solid-state storage subsystem via a SATA signal interface, and no positions being used as active positions for IDE signal lines,
- wherein the non-SATA connector is mounted to the circuit board such that the connector and the non-volatile solid-state storage subsystem are not physically accessible from outside a housing of the host system without removing the housing, and
- wherein the non-volatile solid-state storage subsystem contains a set of instructions corresponding to a boot sequence for the host system.

22. The host system of claim 21, wherein the non-SATA connector includes exactly four electrical contacts that are used to carry data between the non-volatile solid-state storage subsystem and the host system.

23. The host system of claim 21, wherein the non-SATA connector includes a locking mechanism that locks the non-volatile solid-state storage system to the circuit board.

24. The host system of claim 23, wherein the locking mechanism includes a latch.

25. The host system of claim 23, wherein the locking mechanism comprises one or more screws that secure the non-volatile solid-state storage subsystem to the host system.

26. The host system of claim 21, wherein the non-SATA connector is a non-standard connector.

27. The host system of claim 21, wherein the non-SATA connector is a CompactFlash connector.

28. The host system of claim 21, wherein the host system is configured to boot from the non-volatile solid-state storage subsystem.

29. The host system of claim 21, wherein the host system is a single-board computer.

30. The host system of claim 21, wherein the host system is a handheld computer.

31. The host system of claim 21, in combination with the non-volatile solid-state storage subsystem.

32. The host system of claim 31, wherein the non-volatile solid-state storage subsystem includes a locking mechanism for locking to the circuit board.

33. The host system of claim 32, wherein the non-volatile solid-state storage subsystem has a width of less than 30 millimeters.

34. The host system of claim 32, wherein the non-volatile solid-state storage subsystem substantially complies with a CompactFlash form factor.

35. The host system of claim 31, wherein the non-volatile solid-state storage subsystem is configured as a card having a height of less than 30 millimeters.

36. The host system of claim 21, wherein the non-SATA connector provides friction that prevents the non-volatile solid-state storage subsystem from being disconnected from the host system.

37. A computing device having an embedded storage subsystem, comprising:
- a host system processor attached to a circuit board;
- a host system Serial ATA (SATA) controller connected with the host system processor, said SATA controller capable of formatting and transmitting commands from the host system processor;
- an embedded storage subsystem comprising a second controller coupled to non-volatile solid-state storage, said second controller utilizing a SATA signal interface and capable of writing data to, and reading data from, the non-volatile solid-state storage in response to commands received by the storage subsystem from the host system processor; and
- a connector for electrically and pluggably connecting the embedded storage subsystem directly to the circuit board of the host system, said connector having a plurality of positions with a respective position for each of the signal lines of an IDE interface, including active positions with electrical contacts corresponding to SATA signal lines, and having a non-SATA physical configuration,
- wherein the connector is attached to the circuit board and connected with the host system processor via a wiring pattern of the circuit board such that the connector and the embedded storage subsystem are not physically accessible from outside a housing of the computing device without removing the housing, and
- wherein the non-volatile solid-state storage contains a set of instructions corresponding to a boot sequence for the computing device.

38. The computing device of claim 37, further comprising a latching mechanism for selectively attaching the embedded storage subsystem to the connector, wherein the latching mechanism is configured to allow the removal of the embedded storage subsystem when in a disengaged state and to substantially obstruct the removal of the embedded storage subsystem when in an engaged state.

39. The computing device of claim 37, wherein the SATA controller is integrated with the host system processor.

* * * * *

UNITED STATES PATENT AND TRADEMARK OFFICE
CERTIFICATE OF CORRECTION

| | | |
|---|---|---|
| PATENT NO. | : 7,685,338 B2 | Page 1 of 1 |
| APPLICATION NO. | : 11/753502 | |
| DATED | : March 23, 2010 | |
| INVENTOR(S) | : David E. Merry, Jr. | |

It is certified that error appears in the above-identified patent and that said Letters Patent is hereby corrected as shown below:

Title Page; item (56); should read;

On petition requesting issuance of a certificate for correction of inventorship pursuant to 35 U.S.C. § 256, it has been found that the above-identified patent, through error and without deceptive intent, improperly sets forth the inventorship. Accordingly, it is hereby certified that the correct inventorship of this patent is:

David E. Merry, Jr., Irvine, CA (US)

Mark S. Diggs, Laguna Hills, CA (US)

Peter J. Montross, Roseville, CA (US)

Signed and Sealed this

Fifteenth Day of February, 2011

David J. Kappos
*Director of the United States Patent and Trademark Office*